United States Patent
Ray

(10) Patent No.: US 9,167,080 B2
(45) Date of Patent: Oct. 20, 2015

(54) SYSTEM AND METHOD FOR PROVIDING CALLERS WITH LOCAL TIME AND OTHER INFORMATION AT CALLED LOCATIONS

(75) Inventor: Amar N. Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 620 days.

(21) Appl. No.: 12/415,537

(22) Filed: Mar. 31, 2009

(65) Prior Publication Data
US 2010/0246787 A1 Sep. 30, 2010

(51) Int. Cl.
*H04M 3/42* (2006.01)
*H04M 1/247* (2006.01)

(52) U.S. Cl.
CPC ............... *H04M 3/42* (2013.01); *H04M 1/247* (2013.01); *H04M 2203/2011* (2013.01)

(58) Field of Classification Search
CPC ................. H04M 2203/2072; H04M 2207/18; H04M 2242/04; H04M 3/436
USPC ............. 379/201.06–201.08, 142.11–142.12, 379/88.01–88.19, 201.07–207.16; 455/456.1–457, 414.1
See application file for complete search history.

(56) References Cited

U.S. PATENT DOCUMENTS

| | | | | |
|---|---|---|---|---|
| 5,528,558 | A * | 6/1996 | Mardhekar et al. | 368/10 |
| 5,646,986 | A * | 7/1997 | Sahni et al. | 379/221.07 |
| 5,818,920 | A | 10/1998 | Rignell et al. | |
| 6,330,327 | B1 | 12/2001 | Lee et al. | |
| 6,985,744 | B2 * | 1/2006 | Katagishi et al. | 455/456.1 |
| 7,245,924 | B2 | 7/2007 | Katagishi et al. | |
| 7,266,558 | B2 * | 9/2007 | Gray | 455/456.1 |
| 7,474,744 | B2 | 1/2009 | Janssen | |
| 7,941,183 | B2 | 5/2011 | Yomoda | |
| 8,010,086 | B2 | 8/2011 | Gupta | |
| 8,666,043 | B2 | 3/2014 | Ray | |
| 9,094,507 | B2 | 7/2015 | Ray | |
| 2002/0168987 | A1 * | 11/2002 | Wang et al. | 455/456 |
| 2002/0168997 | A1 * | 11/2002 | Katagishi et al. | 455/550 |
| 2003/0023531 | A1 | 1/2003 | Fergusson | |
| 2004/0156486 | A1 * | 8/2004 | Gentry et al. | 379/88.22 |
| 2004/0203848 | A1 | 10/2004 | Kumar | |

(Continued)

OTHER PUBLICATIONS

U.S. Appl. No. 12/275,739; Issue Notification dated Aug. 10, 2011; 1 page.

(Continued)

*Primary Examiner* — Solomon Bezuayehu
(74) *Attorney, Agent, or Firm* — Swanson & Bratschun, L.L.C.

(57) ABSTRACT

A system and method for distributing remote location information to callers who place calls to the remote locations may include storing information at a central computing system. The information may be associated with locations in multiple different time zones and include telephone number identifiers and local times associated with the different respective telephone number identifiers. The information may be distributed to communications network nodes in different time zones. Telephone calls may be processed from callers local to the communications network nodes. In response to receiving a call request at a communications network node from a local caller, a determination by the communications network node using a portion of a called telephone number may be made to determine current time local to the called telephone. The current time local may be communicated to the caller prior to connecting the call with a communications device associated with the called telephone number.

14 Claims, 7 Drawing Sheets

(56) References Cited

U.S. PATENT DOCUMENTS

| | | | |
|---|---|---|---|
| 2005/0070282 A1* | 3/2005 | Hinz | 455/435.1 |
| 2005/0175172 A1* | 8/2005 | Janssen | 379/440 |
| 2006/0286970 A1* | 12/2006 | Otobe et al. | 455/415 |
| 2008/0049746 A1* | 2/2008 | Morrill et al. | 370/389 |
| 2008/0139202 A1* | 6/2008 | Wang et al. | 455/432.1 |
| 2008/0153474 A1* | 6/2008 | Scott | 455/418 |
| 2008/0254773 A1 | 10/2008 | Lee | |
| 2009/0016509 A1* | 1/2009 | Shah | 379/142.11 |
| 2009/0186629 A1 | 7/2009 | Soelberg et al. | |
| 2010/0035585 A1 | 2/2010 | Hadinata et al. | |
| 2010/0130173 A1 | 5/2010 | Gupta | |
| 2010/0246787 A1 | 9/2010 | Ray | |
| 2010/0260327 A1 | 10/2010 | Ray | |
| 2014/0119523 A1 | 5/2014 | Ray | |

OTHER PUBLICATIONS

U.S. Appl. No. 12/275,739; Non-Final Rejection dated Jan. 21, 2011; 10 pages.

U.S. Appl. No. 12/275,739; Notice of Allowance dated May 12, 2011; 10 pages.

U.S. Appl. No. 12/420,218; Final Rejection dated Feb. 29, 2012; 13 pages.

U.S. Appl. No. 12/420,218; Final Rejection dated Jul. 27, 2012; 14 pages.

U.S. Appl. No. 12/420,218; Issue Notification dated Feb. 12, 2014; 1 page.

U.S. Appl. No. 12/420,218; Non-Final Rejection dated Jan. 24, 2012; 16 pages.

U.S. Appl. No. 12/420,218; Non-Final Rejection dated May 24, 2012; 19 pages.

U.S. Appl. No. 12/420,218; Notice of Allowance dated Oct. 15, 2013; 17 pages.

U.S. Appl. No. 14/147,752; Non-Final Rejection dated Oct. 23, 2014; 11 pages.

U.S. Appl. No. 14/147,752; Notice of Allowance dated Feb. 17, 2015; 15 pages.

U.S. Appl. No. 14/147,752; Issue Notification dated Jul. 8, 2015; 1 page.

* cited by examiner

SYSTEM AND METHOD FOR PROVIDING CALLERS WITH LOCAL TIME AND OTHER INFORMATION AT CALLED LOCATIONS

BACKGROUND

The world has become a global society. People no longer simply conduct business locally, regionally, or even nationally. Today, people routinely travel and conduct business internationally. It is not uncommon for businesspeople to call many different countries and time zones throughout the business day. Similar calling situations occur for individuals if calling friends or relatives who live overseas or in different parts of the country. Because calling around the world can become a regular event for people, people often lose track of time in the time zones to which they are calling. While global society has become more of a 24/7 operation, receiving telephone calls in the middle of the night are generally unwelcomed.

In addition to people not paying attention to time zones of called parties, people are generally unaware of holidays in countries around the world. Each country has certain national holidays that "excuse" businesses to shut down for those days. For example, in Brazil, Carnaval is considered a national holiday and most businesses are closed on that date. In the United States, most businesses are closed on Labor Day, Independence Day, and Veterans Day. Callers to Brazil and the United States are generally unaware of the particular days on which these holidays fall. Telephone calls to people in those and other countries on holidays are often surprised and confused when the calls are not answered.

A situation that is more difficult to track by callers about regions around the world are emergency situations that may affect individuals, businesses, and communication services. For example, floods, hurricanes, typhoons, tornadoes, thunderstorms, blizzards, and power outages may cause businesses and telecommunications to be affected. A caller to a friend or business in a region that is being affected by a natural or manmade emergency situation may not be able to reach the friend or business. Unless the caller can reach someone else in the region or access information about the region via the Internet or news source, the caller is unable to determine why he or she cannot reach the called party.

SUMMARY

To overcome the problems of calling people at untimely times of the day or not knowing why a called party does not answer a call due to a national or regional holiday occurring or an emergency event occurring, the principles of the present invention provide for a system that maintains local times of locations around the world, national and local holidays, and emergency situations. In one embodiment, to provide fast response times for callers rather than having to access the information from a central storage location, the principles of the present invention provide for one or more central computing systems, such as a mainframe computing system, to push or otherwise make available current time in the time zone that is being called, holiday, and/or emergency information in an area in which the called party is located to computing systems that are configured to process calls from local callers and on various different communications systems and protocols.

One embodiment of a system for distributing remote location information to callers who place calls to the remote locations may include a central computing system configured to receive and store information associated with locations in multiple different time zones. The information may include telephone number identifiers and local times associated with the different respective telephone number identifiers. Multiple communications network nodes may be distributed in different time zones from the central computing system and be configured to process telephone calls from callers local to the communications network nodes. The communications network nodes may further be configured to receive the information from the central computing systems, store the information, and, in response to receiving a call request, determine, using a portion of the called telephone number, current time local to the called telephone. The current time local of the called telephone may be communicated to the caller prior to connecting the call with a communications device associated with the called telephone number.

One method for distributing remote location information to callers who place calls to the remote locations may include storing information at a central computing system. The information may be associated with locations in multiple different time zones and include telephone number identifiers and local times associated with the different respective telephone number identifiers. The information may be distributed to communications network nodes in different time zones from the central computing system. Telephone calls may be processed from callers local to the communications network nodes. In response to receiving a call request at a communications network node from a local caller, a determination by the communications network node using a portion of a called telephone number may be made to determine current time local to the called telephone. The current time local to the called telephone number may be communicated to the caller prior to connecting the call with a communications device associated with the called telephone number.

BRIEF DESCRIPTION

Illustrative embodiments of the present invention are described in detail below with reference to the attached drawing figures, which are incorporated by reference herein and wherein.

DETAILED DESCRIPTION

Figure 1:
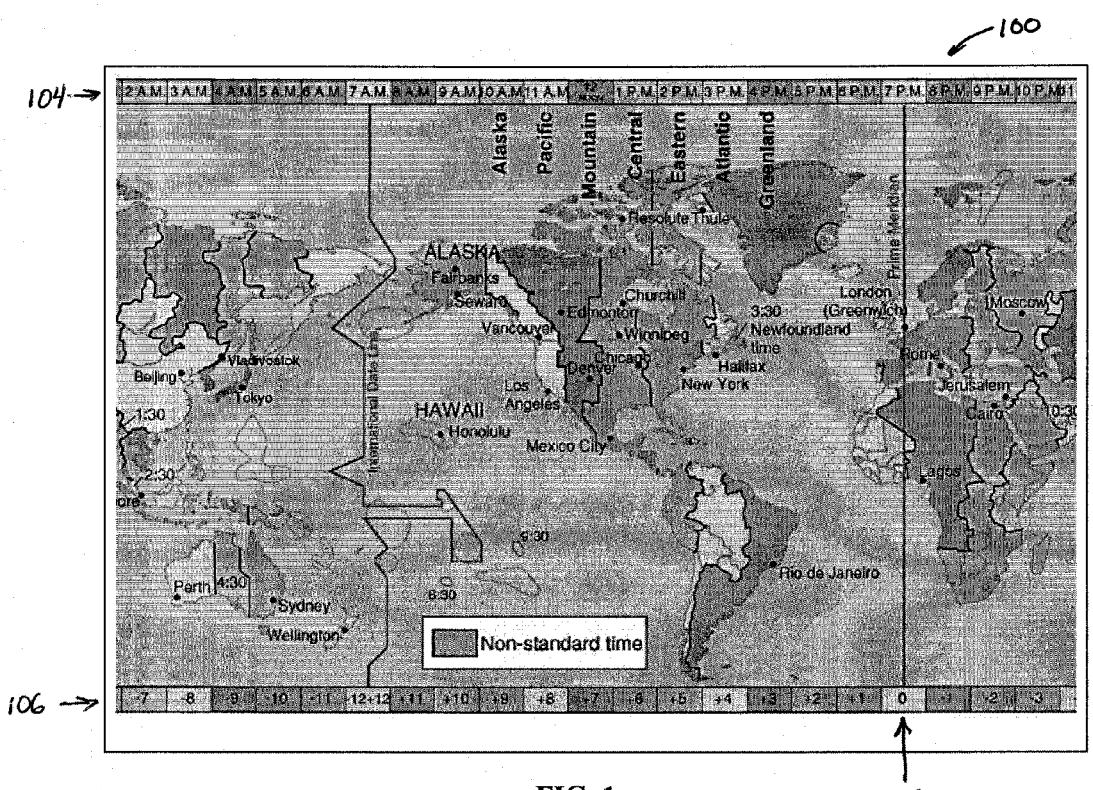
FIG. 1 is an illustration of a world map showing time zones and relative hourly differences from the Prime Meridian timeline.

With regard to FIG. 1, an illustrative map 100 showing time zones across the world is shown. As understood in the art, the Earth is divided by a Prime Meridian line 102 that passes through Greenwich, England. The rest of the world is offset in time based on distance or angle from the Prime Meridian line 102 around the globe, such that there are 24 one-hour time zones. As further understood, telecommunications are worldwide in that each country has its own country code, area codes, city codes, and/or exchange codes that enable people to call others in the same or different countries. Each of the country codes, area codes, city codes, and exchange codes are carefully managed to avoid having any telephone numbers match so as to ensure that each telephone or communications device around the world has a unique telephone number. Each country code, area code, city code, and/or exchange code may be associated with a time zone. In associating the portions of a telephone number (i.e., country code, area code, city code, and/or exchange code), an actual time 104 (e.g., 6 pm, 9 am, etc.) or differential time 106 (e.g., plus three hours, minus six hours, etc.) relative to Prime Meridian time may be associated with each of the telephone number identifiers in different respective time zones, as shown in TABLE I. As shown, each entry includes a country and state listing, country code, area/city code, exchange code, current time, GMT difference, and daylight savings time offset. It should be understood that city listings, zip codes, or any other geographic identifier may be included to further identify an area for both a user to enter information, such as holiday or emergency situation, about the associated geographic area, as further described herein.

TABLE I

| Country | State | Country Code | Area/City Code | Exch. Code | Current Time | GMT Diff | DST |
| --- | --- | --- | --- | --- | --- | --- | --- |
| US | NY | 1 | 212 | 555 | 12:42 PM | −5 | +1 |
| US | TX | 1 | 214 | 769 | 11:42 AM | −6 | +1 |
| US | CO | 1 | 303 | 274 | 10:42 AM | −7 | +1 |
| US | CA | 1 | 310 | 804 | 09:42 AM | −8 | +1 |
| FR | BD | 33 | 2 | 559 | 6:42 PM | +1 | +1 |
| IN | BB | 91 | 22 | 742 | 10:42 PM | +5 | — |

Figure 2:
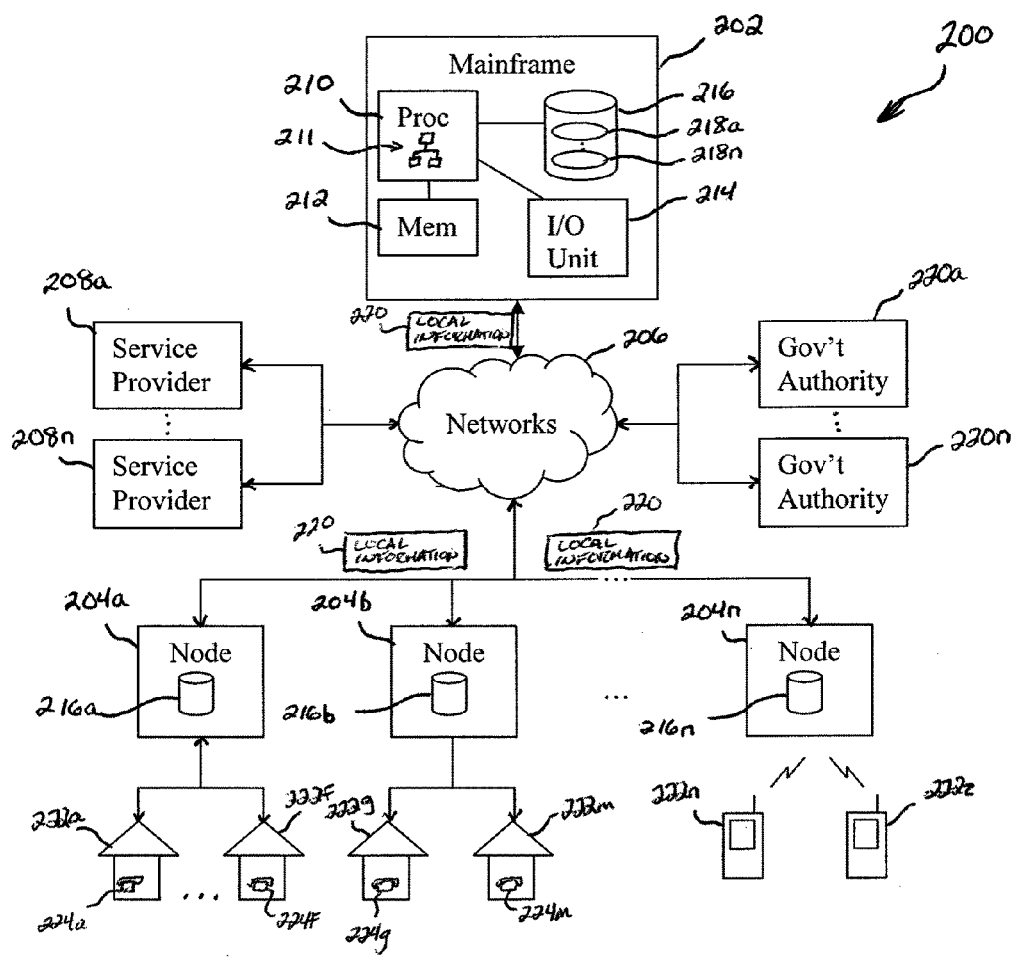
FIG. 2 is a block diagram of an illustrative network environment in which a mainframe computer manages and distributes current times, national and regional holidays, and emergency events associated with area codes and exchange codes and distributes the information to communications network nodes around the world that service users.
Figure 3:
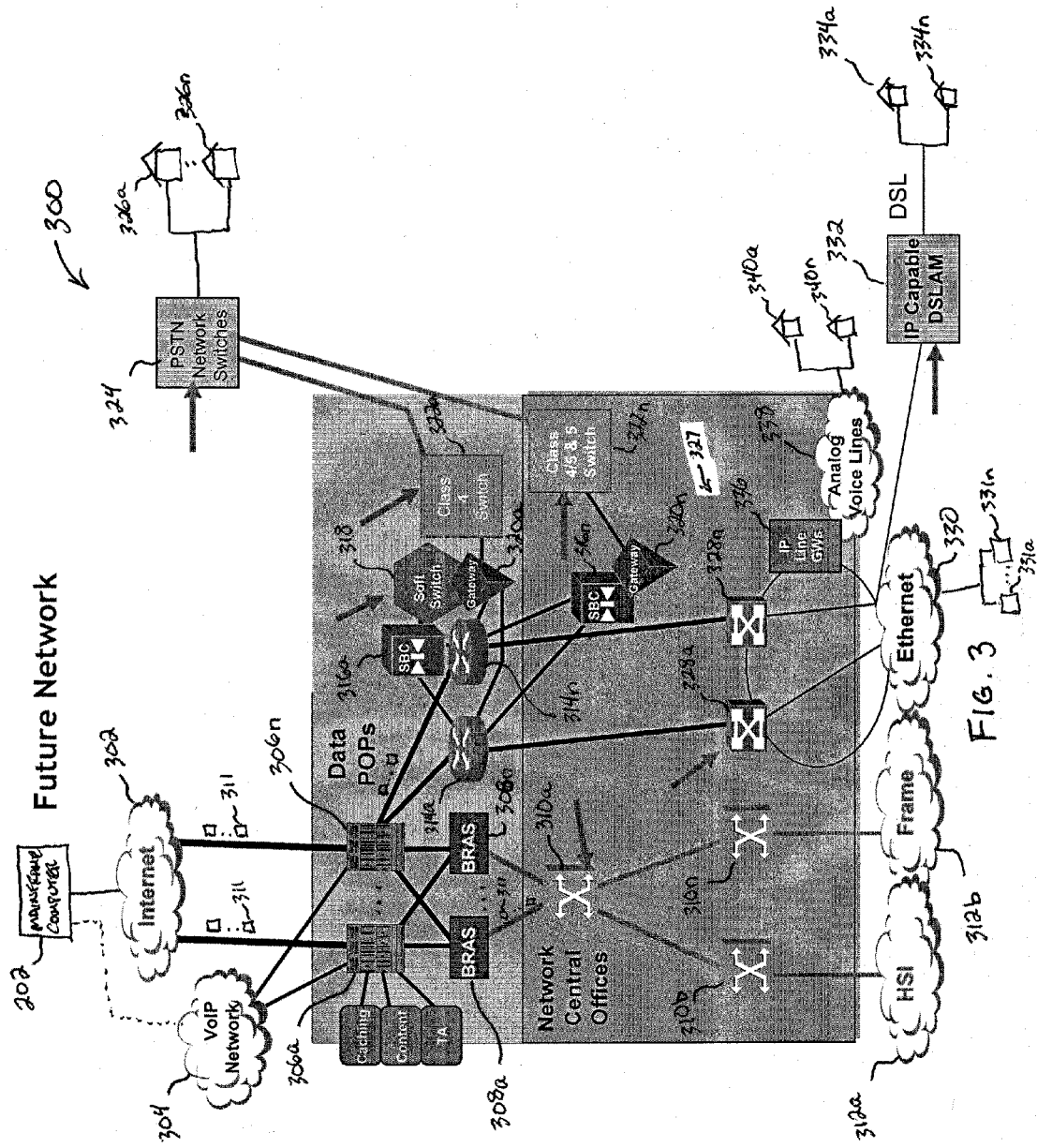
FIG. 3 is an illustration of an illustrative network environment that is more detailed than FIG. 2 and shows specific communications network nodes that may be configured to store and manage information associated with area codes or other portions of telephone numbers in different time zones.

The telephone number identifiers (e.g., area codes) and associated current local times or differential times may be stored in a central computing system, such as a mainframe computing system, and be communicated to communications network nodes throughout the world in one or more communications networks so that callers local to the communications network nodes are able to receive current local times of called parties located within areas that have the telephone number identifiers as part of their telephone numbers, as further described herein with regard to FIGS. 2 and 3. For example, a caller in New York who calls someone in Moscow may, in response to placing the call request, receive a notification either via text or audio (e.g., synthesized voice) of the current local time and/or other information in Moscow.

With regard to FIG. 2, an illustrative network environment 200 is shown to include a mainframe computing system 202 or other central computing system that communicates with communications network nodes 204a-204n (collectively 204) that operate on communications networks 206. The communications network nodes 204 may be any network node that operates on a communications network, such as a digital or analog switch, digital subscriber line access multiplex (DSLAM), and any other communications network node that is configured to provide communications access, routing, or other functionality in the communications networks 206. The communications networks 206 may utilize any protocol of communications that provides analog or digital communications on a communications network, such as the public switched telephone network (PSTN), cellular network, Internet, or any other communications network, as understood in the art.

The mainframe computing system 202 may include a processing unit 210 that includes one or more computer processors, that executes software 211 for collecting and maintaining information local to regions associated with different telephone number identifiers in different time zones. The information may include current time, difference in time with respect to Greenwich Mean Time, national and local holidays, emergency information, and so on. The processing unit 210 may be in communication with a memory 212 that is configured to store data and software, input/output (I/O) unit 214 that is configured to communicate over one or more communications networks 206, and storage unit 216 configured to store one or more data repositories 218a-218n (collectively 218). The data repositories 218 may be configured to store the local information associated with telephone number identifiers, and may be a database or other type of data repository. In one embodiment, the data repositories 218 may be configured as hierarchical databases, relational databases, or any other database configuration, as understood in the art. In one embodiment, the data stored in the data repositories 218 may be configured in a geographic hierarchical database that stores data starting from continent, country, province, state, city, town, area code, exchange code, etc. In one embodiment, each of the different regions may have an abbreviation to identify the different regions (e.g., North America (NA), United States (US), Texas (TX)). Area codes, city codes, and exchange codes would maintain their typical numeric lengths, as shown in TABLE I above.

The local information 220 associated with the telephone number identifiers may be stored in the mainframe computing system 202 and communicated via the networks 206 in data packet format to the communications network nodes 204 for storage in storage units 216a-216n (collectively 216) at each of the respective communications network nodes 204. In one embodiment, the information may be stored in the same format and be identical to that of the information stored at the mainframe computing system 202. Alternatively, the information may be stored in a different format at the communications network nodes 204 or be a subset (e.g., primary cities around the world or area codes called in last 30 days) of the information stored in the mainframe computing system 202 for faster access to provide the information to callers. As shown, each of the communications network nodes 216 services local callers in homes 222a-222f, 222g-222m, and mobile telephones 222n-222z (collectively 222), where the local callers in homes 222a-222f and 222g-222m use telephones 224a-224f and 224g-224m (collectively 224), respectively. The network nodes 204 may be configured to provide analog, digital, or mobile telecommunications services, as understood in the art, and identify the calling party telephone number and called party telephone number to enable the communications network nodes 204 to determine a region, including country, province, state, city, area code, or any other geographic designation that enables the communications network nodes 204 to determine time zone, holidays, and/or emergency information at the called party location.

In one embodiment, when a caller at one of the telephones 222 places a call, the information may be provided via a text or graphical image for display on an electronic display on the telephone. Alternatively, the information local to a called party geographic region (e.g., current local time) may be communicated to the calling party or caller via a voice synthesized communication. In yet another embodiment, the information may be available to the caller using an interactive voice response (IVR) system executed on the communications network nodes 204 or other network node capable of accessing the information local to the called party. For example, the caller may request current weather conditions or local holidays in the local area of the called party prior to the call being connected. If the current date of the called time zone is that of a holiday, a message to a caller may indicate that the current date of the called party is a particular holiday. If the telephones 224 and 222n-222z are configured with electronic displays, the telephone 224 and 222n-222z may execute software that is configured to receive the information local to a called party geographic region and display the information on the electronic displays (e.g., "Called local time 12:03 AM") prior to the call being connected to enable the user to disconnect should the call be placed during an inappropriate time of day of the called party. Alternatively, the information may be communicated to the telephones 224 and 222n-222z in a message (e.g., "The current time in Boston Massachusetts is 12:03 AM. Are you sure you want to place the call? Say 'YES' or press '1' to place the call. Otherwise, say 'NO,' press '2' or hang up to cancel the call.") using voice synthesis and enable the caller to respond using voice or dual-tone multiple-frequency (DTMF) responses. In one embodiment, if the message is a text message, then a user may select a soft-button displayed on the electronic display to respond to the message as to whether or not to continue the call. If the user does not respond within a predetermined time period (e.g., 3 seconds), then the system may automatically connect the call.

While the service providers 208 may be capable of managing local times and holidays associated with area codes and/or city codes associated with telephone numbers, governmental authorities 220a-220n (collectively 220) in each of the area codes that are managed by the mainframe computing system 202 may be provided with the ability to access and update emergency information associated with local areas. In other words, the governmental authorities 220, which may be police or other governmental authority, may be provided access to the data repositories 218 operating on the mainframe computing system 202 to denote certain emergency events that are currently occurring in an area associated with an area code, city code, exchange code, or any other portion of a telephone number or geographic region, as understood in the art. The emergency situations may include natural or manmade events, such as tornadoes, hurricanes, tsunamis, blizzards, earthquakes, fires, power outages, terrorist activities, or any other emergency situation. The emergency information, when updated, may be communicated from the mainframe computing system 202 to each of the communications network nodes 204 so that in the event that a caller local to each of the communications network nodes 204 cannot reach a called party in a region being affected by the emergency situation, the caller will be provided with emergency situation information.

With regard to FIG. 3, another illustrative network environment 300 is shown to include the mainframe computing system 202 that is in communication with the Internet 302. The mainframe computing system 202 may, in addition, be in communication with a voiceover internet protocol (VoIP) network 304. In either case, the mainframe computing system 202 may communicate with communications network nodes 306a-306n (collectively 306) that interface telecommunications networks with the Internet 302 and VoIP network 304. The communications network nodes 306 may be in communication with broadband remote access servers (BRAS) 308a-308n, which are configured to handle distribution of data received from the communications network nodes 306 to communications network nodes 310a-310n (collectively 310, which may be routers, switches, or any other communications network node, as understood in the art). The communications network nodes 310 may communicate and route data packets 311 received from the BRAS 308 to the appropriate network, such as a high speed internet network 312a, frame network 312b, or any other communications network, as understood in the art. To accommodate distributing information local to called parties in different geographic regions throughout the world as maintained by the mainframe computing system 202, the communications network nodes 310 may be configured to store a replica or subset of the information stored by the mainframe computing system 202. In one embodiment, the communications network nodes 310b and 310n may be configured to store the information and execute software that enables the communications network nodes 310b and 310n to access the stored information and communicate the stored information to a caller, as further described herein.

The communications network nodes 306 may further be in communication with routers 314a-314n that may provide routing of data to different telecommunications networks. Session border controllers 316a-316n (collectively 316) may provide an interface from the routers 314 to different telecommunications networks. A soft switch 318 may be in communication with session border controller 316a and be configured to store the information that is maintained by the mainframe computing system 202 and execute software that handles management and access to the information in response to a caller placing a call to a geographic region associated with a portion of a called telephone number, such as area code. The routers 314 and soft switch 318 may further be in communication with gateways 320a-320n (collectively 320) that, in operation, provide for transformation of data to a protocol that is capable of being communicated over the PSTN via class 4, 5, and 4/5 322a-322n (collectively 322). In one embodiment, the switches 322 may be configured with storage units and software that operate to store the information maintained by the mainframe computing system 202. The switches 322 may further be in communication with PSTN network switches 324. In one embodiment, the PSTN network switches 324 may be configured with the software and information from the mainframe computing system 202 so that users in residential or commercial establishments 326a-326n (collectively 326) can have access to the information local to called parties located around the world. In other words, by pushing the information from the mainframe computing system 202 out to the lowest point of the network that is possible to cover users when placing calls to a communications network, the information 202 may be accessed by users and the information may be presented to the users with minimal delay and maximum efficiency.

As further shown, a digital communications network 327 may include switches 328a-328n (collectively 328) that are in communication with the routers 314. The switches 328 may be digital switches and capable of operating in a token ring network or other network configuration, as understood in the art. In one embodiment, the switches 328 may be configured to operate software and store information from the mainframe computer 202, as previously described. The switches 328 may be in communication with an Ethernet network 330 that services users 331a-331n (collectively 331) that may place telephone calls to people around the world using computers or other digital electronic communications devices that provide for voice calls. The Ethernet network 330 may further be in communication with an IP capable DSLAM 332 that is configured to provide DSL communications services to users 334a-334n (collectively 334). The IP capable DSLAM 332 may be configured with software and store the information from the mainframe computing system 202 so that the users 334 may, when placing a call to someone around the world in a different time zone or area code, receive information, such as current time, holiday, and/or emergency information from a region in which the called party is located. The communications network may further include IP line gateways 336 and analog voice lines 338 that provide analog communications services to users 340a-340n (collectively 340). The information stored in the switches 328 may be accessed when the users 340 place calls to people in different time zones, as described herein.

Figure 4:
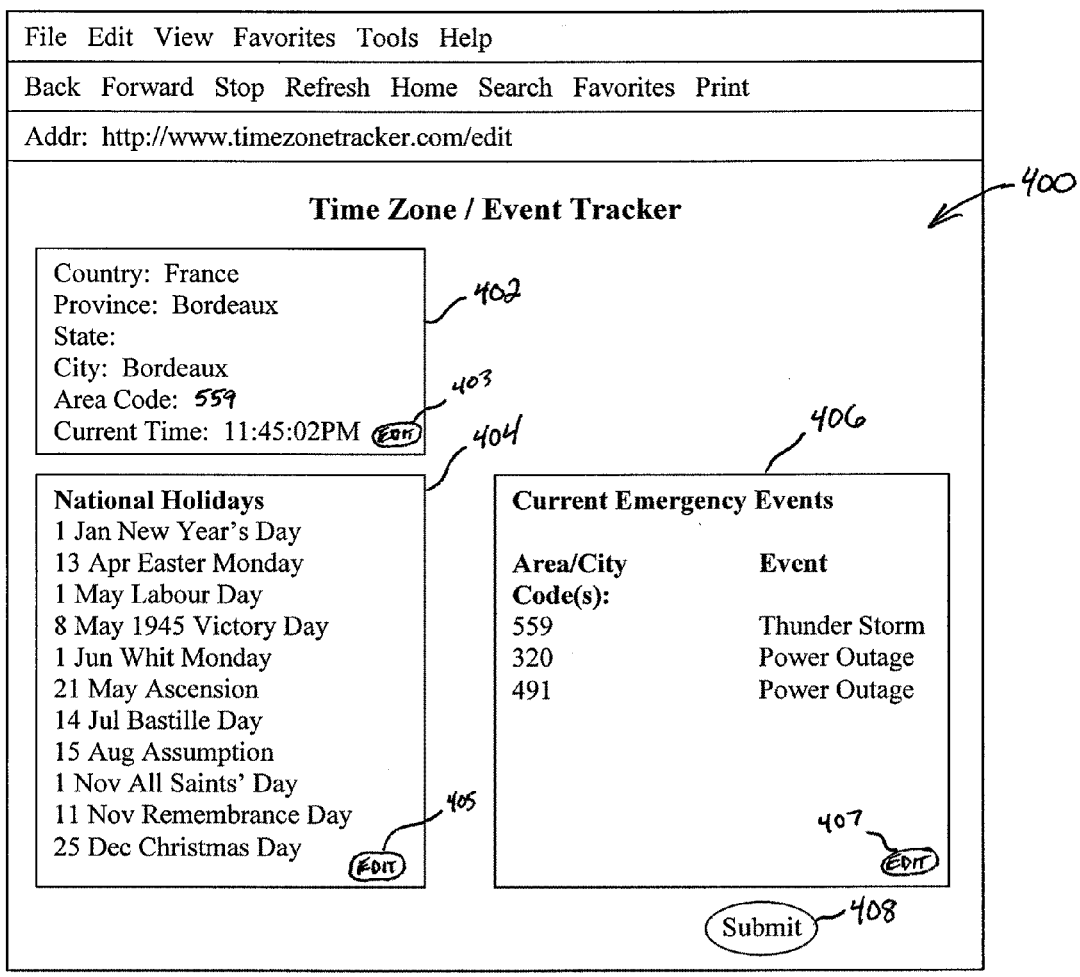
FIG. 4 is a screenshot of an illustrative graphical user interface that enables users to set up current local time, holidays, and current emergency events associated with an area code or other portion of telephone numbers occurring in a region in which the area code or other portion of telephone numbers reside.

With regard to FIG. 4, a screenshot 400 of an illustrative graphical user interface (GUI) that enables a user to enter time associated with an area code or city code, holidays, both national and local, and current emergency events occurring within an area code, city code, exchange code, or otherwise. As shown, a first portion of the GUI 400 displays a region, including country (e.g., "France"), province, (e.g., "Bordeaux"), state, city (e.g., "Bordeaux"), area code (e.g., "559"), and current time. The user, such as a telecommunications service provider that operates a communications network in the area code "559," may establish a current time. Alternatively, rather than entering the current time, an offset from Greenwich Mean Time may be entered or otherwise selected. In one embodiment, each of the entries may be selectable from a list of entries, such as a drop-down menu that lists every country, every province and/or state in the country, every area code within the country and current time in the area code. If there are multiple time zones in a single area code, an exchange code may be available to provide better resolution for selection so that the exchange code may have a current time associated therewith. In one example, if a caller places a call to a particular exchange code within an area code, both the area code and exchange code may be used to determine current time in the location of the called party.

A second region 404 of the GUI 400 may include a listing of holidays, such as national holidays and/or local holidays, where the holidays may signify that government or commercial operations are closed for the day. As shown, the national holidays of France are shown in the portion 404 of the GUI 400. In one embodiment, a user may select an edit soft-button 405 to change or update national holidays or local holidays (not shown).

In a third portion 406 of the GUI 400, current emergency events may be listed in association with area and/or city codes. For example, city code 559 may be listed with a thunderstorm that is currently ongoing. In one embodiment, an edit soft-button 407 may be selectable by a user to update current emergency events or other events that may affect communications in the area code or city code. It should be understood that the terms area code and city code are the names of portions of a telephone number or telephone number identifier (e.g., area code) and that other names may be utilized based on names of telephone number portions in different countries. It should further be understood that while area codes and city codes are shown, that country codes, exchange codes, and any other codes that may be helpful to specifying a particular geographic area in which users connect to a communications network, analog or digital, around the world. It should be further understood that the GUI 400 is illustrative and that many other form and features may be available to a user to establish current time, add new area codes or exchange codes, update holidays, add or delete current emergency events, or provide other information that may be beneficial to callers of called parties in different areas around the world. It should further be understood that one or more aspects of the GUI 400 may be automated, such as whether events being automatically collected from a national weather service computer system to update current emergency events in certain area codes.

In one embodiment, users who may have access to the GUI 400 may be provided with a username and password to change information associated with different areas around the world. The users may be communications service provider employees, governmental employees, or any other users that a manager of a mainframe computing system that stores and distributes information associated with different areas around the world may allow to have access to update or change the information. Before the information may be distributed from the mainframe computing system to communications network nodes around the world, an administrator may be required to approve of the updated information to ensure information integrity. Software executed on the mainframe computing system may be configured to identify that a change was made to the information and communicate the changed information to communications network nodes around the world. Alternatively, the software may be configured to respond to a user request to distribute the information around the world. However, because changes may occur so frequently due to emergency situations, such as weather situations, the system may be automated to distribute the information. One way for the GUI 400 to be configured to minimize the possibility of a user entering false or incorrect information may be to limit a user's ability to enter information other than what is available to the user via a pre-established list of emergency events and other information. Upon the user having updated the information, the user may select a soft-button 408 to submit the information to the mainframe computing system to update the information and distribute the information to communication network nodes around the world.

Figure 5:
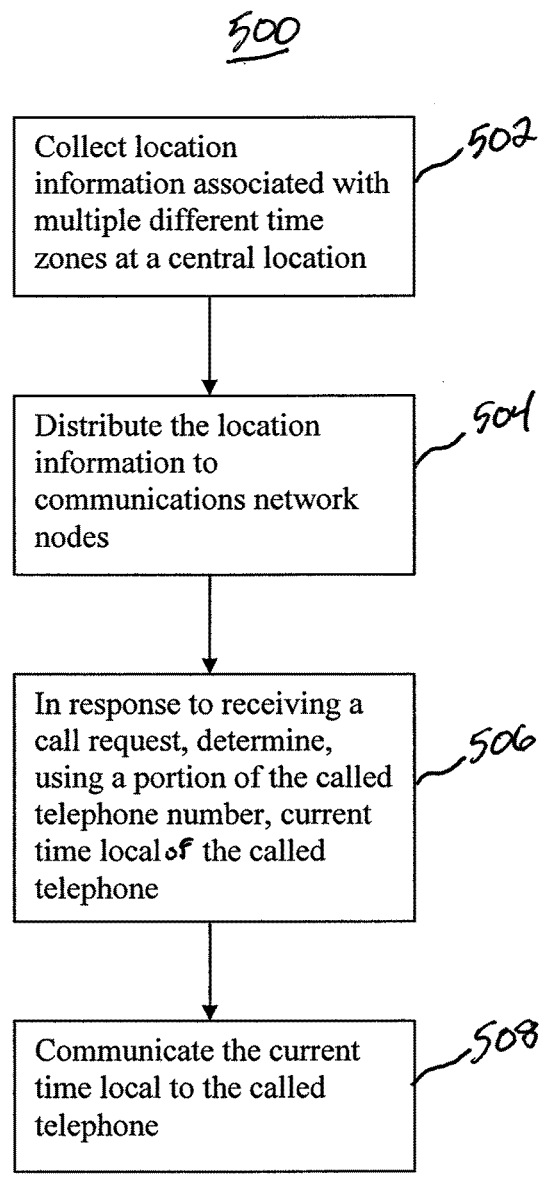
FIG. 5 is a flow diagram of an illustrative process for a central computing system to distribute local information associated with different time zones to communications network nodes.

With regard to FIG. 5, a flowchart showing an illustrative process 500 for a central computing system to collect information from different time zones from around the world and distribute the information to communications network nodes around the world. The communications network nodes may communicate the information to callers in response to receiving calls from the callers to the different time zones around the world. The process 500 starts at step 502, where location information associated with multiple different time zones is collected at a central location. In one embodiment, the central location may be a mainframe computing system operating on the Internet or other communications network. Although described as a central location, it should be understood that a central location may be considered multiple computing systems that operate in conjunction with one another to collect and distribute information around the world, where, for example, multiple mainframe computing systems may collect information from different continents and communicate that information to one another for distribution in countries within each respective continent. At step 504, the location information may be distributed to communications network nodes around the world. The communications network nodes may be switches, DSLAMs, servers, routers, or any other communications network node that may be configured to store the information from the central location and communicate select information to callers who place calls to different areas associated with the location information.

At step 506, in response to receiving a call request, a determination may be made using a portion of the called telephone number about current local time of the called telephone. The current local time of the called telephone may be determined by determining an area code of the telephone number that has been called, exchange code of the telephone number that has been called, or any other information (e.g., country code of the called telephone number). At step 508, the current local time may be communicated to the called telephone. In one embodiment, the current local time may be communicated in a data format for display on an electronic display at the telephone being used by the caller. Alternatively, the current local time may be communicated to the caller using a voice synthesizer, as understood in the art. The communication network nodes may be configured to determine a type of telephone (e.g., plain old telephone system (POTS), voice over Internet protocol (VoIP) telephone, mobile telephone) and communications protocol (e.g., time division multiple access (TDMA), asynchronous transfer mode (ATM), and digital subscriber line (DSL) that is being used to service the telephone to determine how to communicate the information, such as the current time local to the called telephone. Depending on the type of telephone and communications protocol, a text message or audible message may be communicated to the caller.

Figure 6:
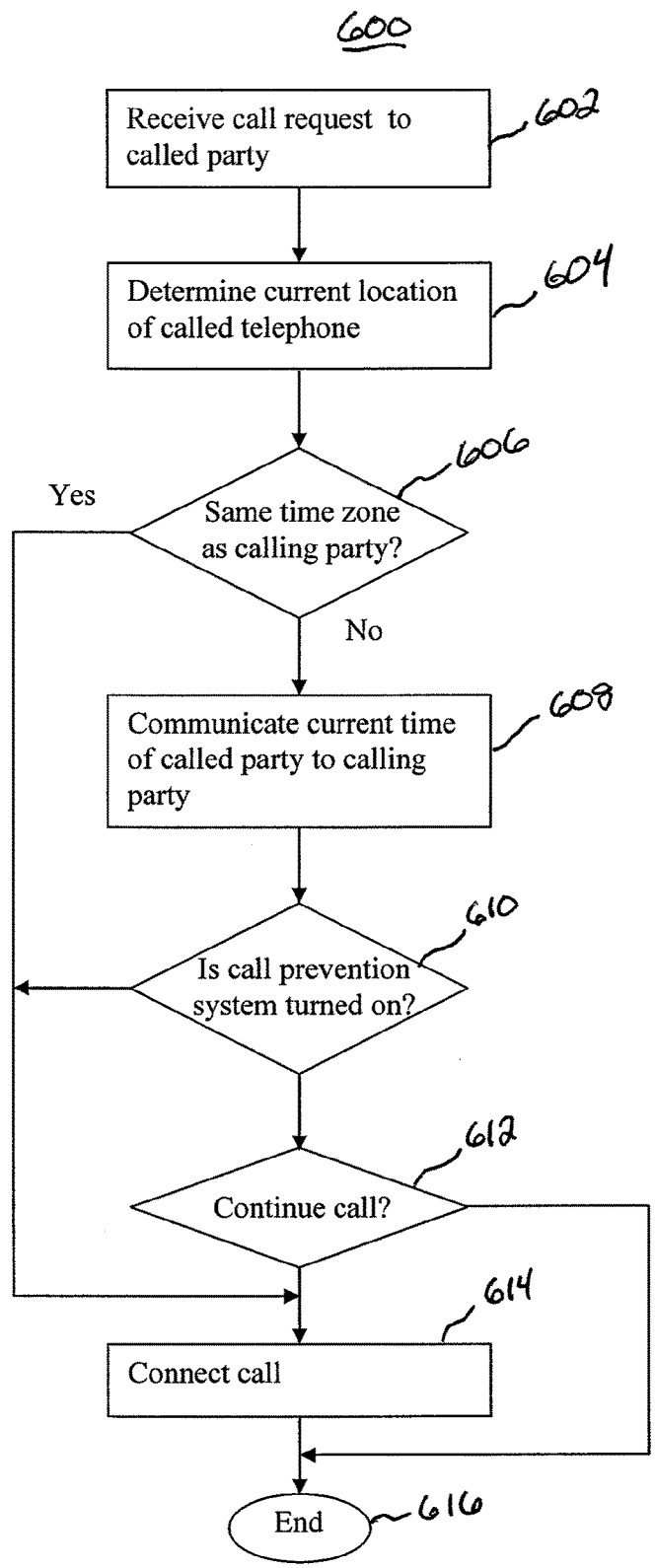
FIG. 6 is a flowchart of an illustrative process for a communications network node local to a calling party to handle a call to a called party in a different time zone.

With regard to FIG. 6, a flowchart of an illustrative process 600 for a communications network node to receive a call request and communicate information associated with a location of the called telephone is shown. The process 600 starts at step 602, where a call request to a called party is received. The call request may include a telephone number having a country code, area code, city code, exchange code, or any other code that may assist in identifying a geographic location of a called telephone. At step 604, a determination of a current location of the called telephone may be determined. If the called telephone is identified as a stationary phone, such as a home phone or office phone, the current location may easily be determined based on the telephone number itself. If it is determined that the called telephone is a mobile telephone by accessing a database in the communications network that is maintained by a service provider or otherwise, a current location of the mobile telephone may be determined based on an access point, such as a mobile switching center (MSC), to which the mobile telephone is in communication. In one embodiment, prefix numbers, such as a network access code (e.g., "9"), international calling code (e.g., "001"), or other non-geographic related digits that enable a user to place a call may be ignored. Furthermore, local and obvious non-business or non-personal calls (e.g., "411") may be ignored and information associated with the called telephone numbers may not be presented to the caller.

At step 606, a determination may be made as to whether the calling party is in the same time zone or same geographic area. If not, then the process continues at step 608, where a current time of the called party may be communicated to the calling party. In communicating the current time of the called party, the communication may be in the form of text or audio, as previously described. At step 610, a determination may be made as to whether a call prevention system is turned on. The call prevention system may operate to require that the caller, in response to receiving a current time at the called telephone number, affirmatively request to continue with the current telephone call, as provided by step 612. If it is determined at step 610 that a call prevention system is not turned on, then the process continues at step 614, where the call is connected to the called telephone. The process ends at step 616. If, at step 612, it is determined that the user does not wish to continue the call, then the process skips step 614 and the call is ended at step 616. If it is determined at step 606 that the called telephone number is in the same time zone as the calling party, then the process skips to step 614 where the call is connected to the called telephone as the calling party should be aware of the current time in his or her time zone.

Figure 7:
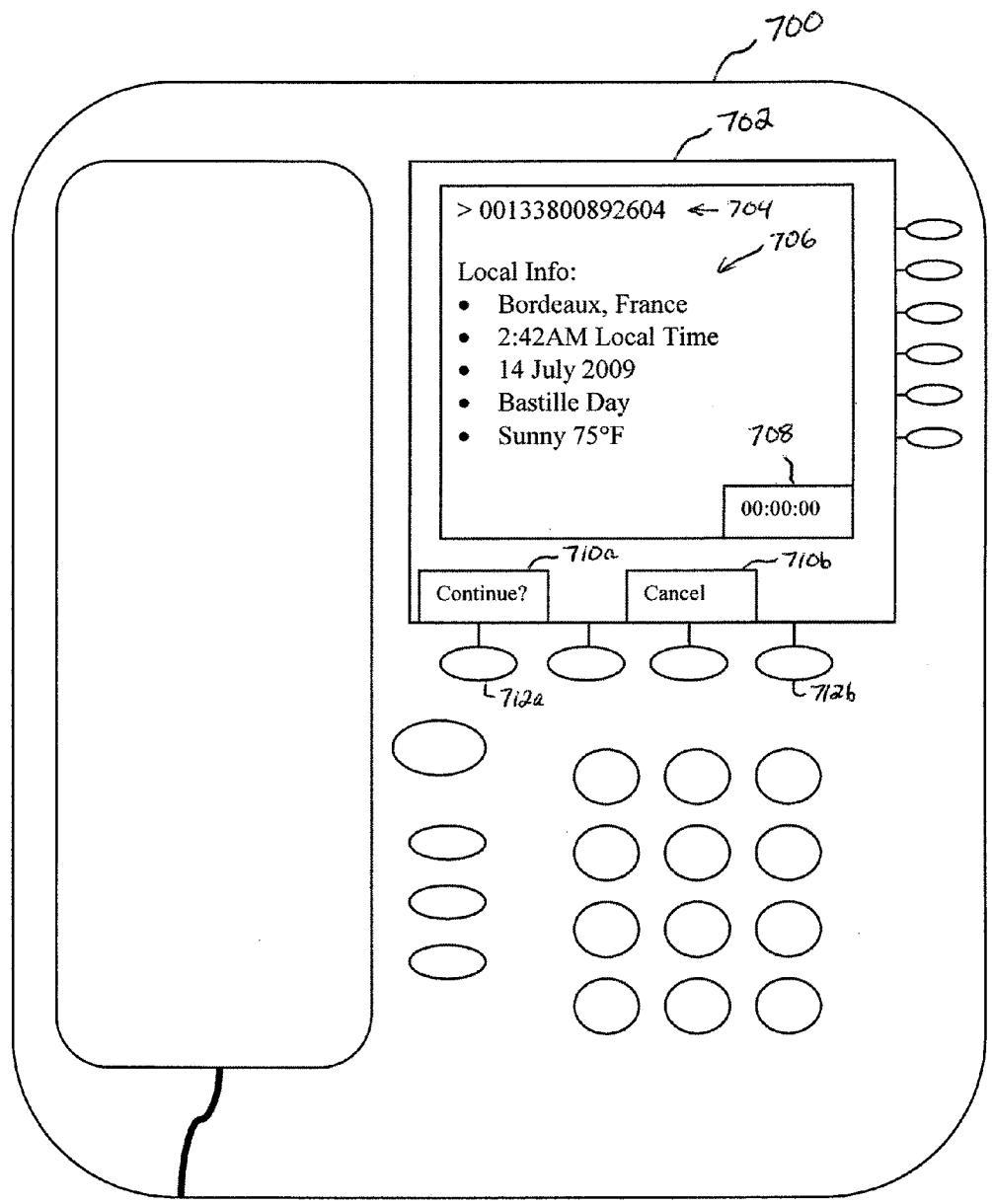
FIG. 7 depicts an illustrative telephone shown to include an electronic display that shows a telephone number to which a user is calling.

With regard to FIG. 7, an illustrative telephone 700 is shown to include an electronic display 702 that shows a telephone number 704 to which a user is calling. A graphical user interface 706 may display local information to the called location, in this case Bordeaux, France. The local information may include current local time, current date, weather, emergency information or any other information at the called location. As shown, a connection time 708 may display amount of time that the call is connected. As further shown, the connection time 708 is 00:00:00, as the caller has not elected connect the call or not by selecting one of the soft-buttons 710a or 710b (i.e., "Continue?" or "Cancel" call). To select a soft-button 710a or 710b, the caller may press a hard-button 712a or 712b. If the electronic display 702 were a touch-screen, then the caller could simply press a soft-button 710a or 710b. In one embodiment, if the caller does not select to continue or cancel the call within a predetermined time period (e.g., 3 seconds), the call may be connected or not connected depending on how the system is configured. If, for example, the local time at the called location is after business hours (e.g., before 8 AM or after 6 PM), then the call may not be connected if a selection is not made. However, if the call is during business hours, then the call may be connected.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for distributing remote location information to callers who place calls to the remote locations, said system comprising:

a server computer system configured to receive and store information associated with locations in multiple different time zones, the information including telephone number identifiers, local times associated with each of the telephone number identifiers, names and dates of national holidays in countries associated with each of the telephone number identifiers, and emergency information of currently occurring emergencies in regions associated with each of the telephone number identifiers;

a plurality of communications network nodes distributed in different time zones from said server computer system, said plurality of communications network nodes each comprising a voice over Internet Protocol (VoIP) soft switch configured to provide telephony services to a plurality of telephones and configured to process telephone calls from said plurality of telephones, each of said communications network nodes further configured to:

receive the information stored at the server computer system from the server computer system;

store the information in local data storage at each of said communications network nodes;

in response to receiving a call request from a caller at one of the communications network nodes, compare at least a portion of a called telephone number with the stored telephone number identifiers to determine a time differential, calculate a current time local to the called telephone number based on the time differential, determine whether the current time falls on one of the national holidays of a country associated with the called telephone number, and determine an emergency information associated with called telephone number based on the emergency information associated with the telephone number identifiers;

determine how to communicate to the caller based on a type of telephone and communications protocol that is being used to service the call;

communicate, using the determined communication, the current time local to the called telephone number and the determined emergency information to the caller prior to connecting the call;

wherein, if the current time falls on a national holiday in the country associated with the called telephone number, the communications network node is further configured to communicate national holiday information to the caller prior to connecting the call; and wherein, if the server computer system receives a change to the emergency information, the server computer system is further configured to communicate the change to the emergency information to each of communications network nodes, and each of the communication node is configured to update the stored emergency information with the change to the emergency information.

2. The system according to 1, wherein the emergency information includes natural and manmade emergency information.

3. The system according to claim 1, wherein the communications network nodes include at least one of a class 4 switch, class 5 switch, ATM switch, and broadband digital loop carrier.

4. The system according to claim 1, wherein each of said communications network nodes is configured to store a database including a copy of the information.

5. The system according to claim 4, wherein the copy of the information is stored in a hierarchical format, the hierarchical format including a geographical hierarchical data structure.

6. The system according to claim 1, wherein said server computer system is configured to provide a graphical user interface to enable users to enter date and time information, holiday information, and emergency information.

7. The system according to claim 1, wherein the communications network node is further configured to:

determine whether the call request is received during a period defined by a first and second time local to the called telephone number;

in response to determining that the call request is received during the period defined by the first and second time local to the called telephone number, prompt a caller with a current local time to the called telephone number and a selectable option to continue the call; and in response to receiving a response from the caller to the prompt, determine whether the caller selected an option to continue the call, and, if so, connect the call to the called telephone, otherwise, do not connect the call to the called telephone number.

8. A method for distributing remote location information to callers who place calls to the remote locations, said method comprising:

storing information at a server computer system, the information being associated with locations in multiple different time zones and including telephone number identifiers, local times associated with each of the telephone number identifiers, names and dates of national holidays in countries associated with each of the telephone number identifiers, and emergency information of currently occurring emergencies in regions associated with each of the telephone number identifiers;

distributing the information to communications network nodes in different time zones from the server computer system, said communications network nodes each comprising a voice over Internet Protocol (VoIP) soft switch configured to provide telephony services to a plurality of telephones;

each communication network node being capable of processing telephone calls from local telephones to the communication network node;

in response to receiving a call request, at one of the communications network nodes, from a caller, comparing, by the communications network node, at least a portion of a called telephone number with the stored telephone number identifiers to determine a time differential, calculate a current time local to the called telephone number based on the time differential, determine whether the current time falls on one of the national holidays of a country associated with the called telephone number, and determine an emergency information based on the emergency information associated with the telephone identifiers;

determining how to communicate to the caller based on type of telephone and communications protocol that is being used to service the telephone;

communicating, by the communications network node, using the determined communication, the current time local to the called telephone number and the determined emergency information to the caller prior to connecting the call;

if the current time falls on a national holiday in the country associated with the called telephone number, further communicating, by the network communications node, national holiday information to the caller prior to connecting the call; and if the server computer system receives a change to the emergency information:

communicating the change to the emergency information from the server computer system to each of communications network nodes; and updating, by of the communication nodes are configured to the stored emergency information with the change to the emergency information.

9. The method according to 8 wherein storing the emergency information includes storing natural and manmade emergency information.

10. The method according to claim 8, wherein the communications network nodes are capable of communicating over a time division multiplex access network, asynchronous transfer mode network, and digital subscriber line network.

11. The method according to claim 8, further comprising storing a database at each of the communications network nodes that includes a copy of the information at the server computer system.

12. The method according to claim 11, wherein storing a copy of the information at each of the communications network nodes includes storing a copy in a hierarchical format, wherein the hierarchical format includes a geographical hierarchical data structure.

13. The method according to claim 8, further comprising providing, by the server computer system, a graphical user interface to enable users to enter date and time information, holiday information, and emergency information.

14. The method according to claim 8, further comprising:
   determining, at the communications network node, whether the call request is received during a period defined by a first and second local time associated with the called telephone number;
   in response to determining that the call request is received during the period defined by the first and second local time associated with the called telephone number, prompting a caller with the current local time associated with the called telephone number and a selectable option to continue the call; and
   in response to receiving a response from the caller to the prompt, determining whether the caller selected an option to continue the call, and, if so, connecting the call to a communication device associated with the called telephone number, otherwise, not connecting the call to the communication device associated with the called telephone number.

\* \* \* \* \*